(12) United States Patent
Tsubosaka et al.

(10) Patent No.: US 9,397,349 B2
(45) Date of Patent: Jul. 19, 2016

(54) FUEL CELL

(75) Inventors: Kenji Tsubosaka, Susono (JP); Hitoshi Hamada, Gotenba (JP); Manabu Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 980 days.

(21) Appl. No.: 13/503,233

(22) PCT Filed: Nov. 18, 2010

(86) PCT No.: PCT/IB2010/002939
§ 371 (c)(1),
(2), (4) Date: Apr. 20, 2012

(87) PCT Pub. No.: WO2011/064637
PCT Pub. Date: Jun. 3, 2011

(65) Prior Publication Data
US 2012/0225367 A1    Sep. 6, 2012

(30) Foreign Application Priority Data
Nov. 27, 2009    (JP) .................. 2009-270126

(51) Int. Cl.
| | |
|---|---|
| *H01M 8/10* | (2016.01) |
| *H01M 8/02* | (2016.01) |
| *H01M 8/04* | (2016.01) |
| *H01M 4/86* | (2006.01) |
| *H01M 8/12* | (2016.01) |
| *H01M 8/14* | (2006.01) |

(52) U.S. Cl.
CPC .......... *H01M 8/0236* (2013.01); *H01M 4/8652* (2013.01); *H01M 4/8657* (2013.01); *H01M 8/0226* (2013.01); *H01M 8/0228* (2013.01); *H01M 8/0245* (2013.01); *H01M 8/04149* (2013.01); *H01M 8/0234* (2013.01); *H01M 2008/1095* (2013.01); *H01M 2008/1293* (2013.01); *H01M 2008/147* (2013.01); *H01M 2250/20* (2013.01); *Y02E 60/50* (2013.01);
(Continued)

(58) Field of Classification Search
CPC .......... H01M 8/0236; H01M 8/04149; H01M 8/1016; H01M 8/1023; H01M 4/8807
See application file for complete search history.

(56) References Cited

U.S. PATENT DOCUMENTS

| | | |
|---|---|---|
| 2007/0099052 A1 | 5/2007 | Frey et al. |
| 2008/0160380 A1 | 7/2008 | Hamrock |

(Continued)

FOREIGN PATENT DOCUMENTS

| | | |
|---|---|---|
| CN | 101145612 A | 3/2008 |
| JP | A-2004-327074 | 11/2004 |

(Continued)

OTHER PUBLICATIONS

Feb. 9, 2012 Office Action issued in Japanese Patent Application No. 2009-270126 (with translation).

(Continued)

*Primary Examiner* — Alix Eggerding
(74) *Attorney, Agent, or Firm* — Oliff PLC

(57) ABSTRACT

A fuel cell includes: a membrane-electrode assembly in which electrode catalyst layers are formed on two sides of an electrolyte membrane; and a cerium-containing layer that is formed at an outer side of at least one of the two surfaces of the membrane-electrode assembly, and that contains a cerium-containing oxide in an amount that is greater than 5 wt % and less than or equal to 30 wt % where 100 wt % is an amount of solid components except the cerium-containing oxide which form the cerium-containing layer.

5 Claims, 5 Drawing Sheets

(52) U.S. Cl.
CPC .............. *Y02E60/525* (2013.01); *Y02E 60/526* (2013.01); *Y02T 90/32* (2013.01)

(56) References Cited

U.S. PATENT DOCUMENTS

| | | | |
|---|---|---|---|
| 2009/0317686 A1* | 12/2009 | Huston et al. ................ | 429/34 |
| 2011/0020724 A1 | 1/2011 | Kim et al. | |
| 2011/0064639 A1* | 3/2011 | Murota ................ | C01G 25/006 423/263 |

FOREIGN PATENT DOCUMENTS

| | | |
|---|---|---|
| JP | A-2006-244782 | 9/2006 |
| JP | A-2006-261004 | 9/2006 |
| JP | A-2007-213851 | 8/2007 |
| TW | 200937710 A | 9/2009 |
| WO | WO 2007/029346 A1 | 3/2007 |
| WO | WO 2008/083091 A1 | 7/2008 |
| WO | WO 2009/085327 * | 7/2009 |
| WO | WO 2009/101984 * | 8/2009 |

OTHER PUBLICATIONS

Apr. 12, 2011 International Search Report issued in International Patent Application No. PCT/IB2010/002939.

Mar. 12, 2012 International Preliminary Report on Patentability issued in International Patent Application No. PCT/IB2010/002939.

Apr. 12, 2011 Written Opinion of the International Searching Authority issued in International Patent Application No. PCT/IB2010/002939.

* cited by examiner

FUEL CELL

FIELD OF THE INVENTION

The invention relates to a fuel cell.

BACKGROUND OF THE INVENTION

Fuel cells, which generate electricity by electrochemical reaction between a fuel gas and an oxidant gas, are drawing attention as an energy source. Among such fuel cells, a solid polymer type fuel cell has a membrane-electrode assembly (hereinafter, also referred to as "MEA") in which an anode electrode catalyst layer and a cathode electrode catalyst layer are formed on two sides of a polymer electrolyte membrane (hereinafter, also referred to simply as "electrolyte membrane") that has proton conductivity. Gas diffusion layers made up of a carbon cloth, a carbon paper and the like are stacked on the two sides of the MEA. The gas diffusion layers and the MEA are joined by thermocompression bonding or the like in a production process of the fuel cell.

The electrolyte membrane provided in the solid polymer type fuel cell exhibits high proton conductivity when in a wet state, and the proton conductivity thereof declines with declines in the water content thereof. A decline in the proton conductivity leads to a decline in the electricity generation performance of the fuel cell. In order to maintain an electric cell performance of the fuel cell, it is necessary to maintain a sufficient water content in the electrolyte membrane. However, in general, fuel cells are often used outdoors. Therefore, particularly when the temperature is high, the water having evaporated in the MEA (i.e., the electrolyte membrane and the electrode catalyst layers) passes through the gas diffusion layers, and is let out of the fuel cell together with a reactant gas, so that the water content of the MEA declines. As a result, there arises a problem in which the proton conductivity of the electrolyte membrane sharply declines, and therefore the performance of the fuel cell declines. WO 2007/029346 discloses an organic-inorganic hybrid material that is capable of providing high proton conductivity in a wide temperature range from low to high. However, as for the gas diffusion layers stacked on both sides of the MEA, sufficient contrivance has not been made.

The foregoing problem is common not only to fuel cells that have gas diffusion layers described above, but also to fuel cells that do not have gas diffusion layers (e.g., a fuel cell that is not equipped with gas diffusion layers but employs separators in which a gas channel is formed in a surface that contacts the membrane-electrode assembly).

SUMMARY OF THE INVENTION

The invention provides a fuel cell that is capable of restraining decline in the water content of the membrane-electrode assembly.

The invention relates to a fuel cell. This fuel cell includes a membrane-electrode assembly in which electrode catalyst layers are formed on two surfaces of an electrolyte membrane; and a cerium-containing layer that is formed at an outer side of at least one of the two surfaces of the membrane-electrode assembly, and that contains a cerium-containing oxide in an amount that is greater than 5 wt % and less than or equal to 30 wt % where 100 wt % is an amount of solid components except the cerium-containing oxide which form the cerium-containing layer. According to this fuel cell, since the cerium-containing layer that contains the cerium-containing oxide in an amount greater than 5 wt % and less than or equal to 30 wt % is provided at an outer side of at least one of the two surfaces of the membrane-electrode assembly, it is possible to restrain the decline in the water content of the membrane-electrode assembly.

In the foregoing fuel cell, the cerium-containing oxide may be a composite of cerium oxide ($CeO_2$) and zirconium oxide ($ZrO_2$). According to this fuel cell, since a composite of cerium oxide and zirconium oxide is used as the cerium-containing oxide, the decline in the water content of the membrane-electrode assembly can be restrained.

The foregoing fuel cell may further include a gas diffusion layer that is provided at an outer side of at least one of the electrode catalyst layers and that is formed by an electroconductive porous member. The cerium-containing layer may be a water-repellent layer that is a portion of the gas diffusion layer and that contains carbon and a water-repellent material that are provided at an interface between the gas diffusion layer and the membrane-electrode assembly. According to this fuel cell, the water-repellent layer formed as a portion of the gas diffusion layer can be caused to function as a cerium-containing layer.

In the foregoing fuel cell, an amount of cerium oxide contained in the cerium-containing oxide may be greater than or equal to 85 wt % and less than or equal to 90 wt % where 100 wt % is an amount of solid components of the cerium-containing oxide. According to the fuel cell, it is possible to reduce the dissolution velocity of cerium oxide that is contained in the cerium-containing oxide.

In the fuel cell, an additive amount of zirconium oxide may be greater than or equal to 10 wt % and less than or equal to 15 wt % where 100 wt % is an amount of solid components of the cerium-containing oxide. Besides, the additive amount of zirconium oxide may be 12.5 wt %.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF THE EMBODIMENTS

Figure 1:
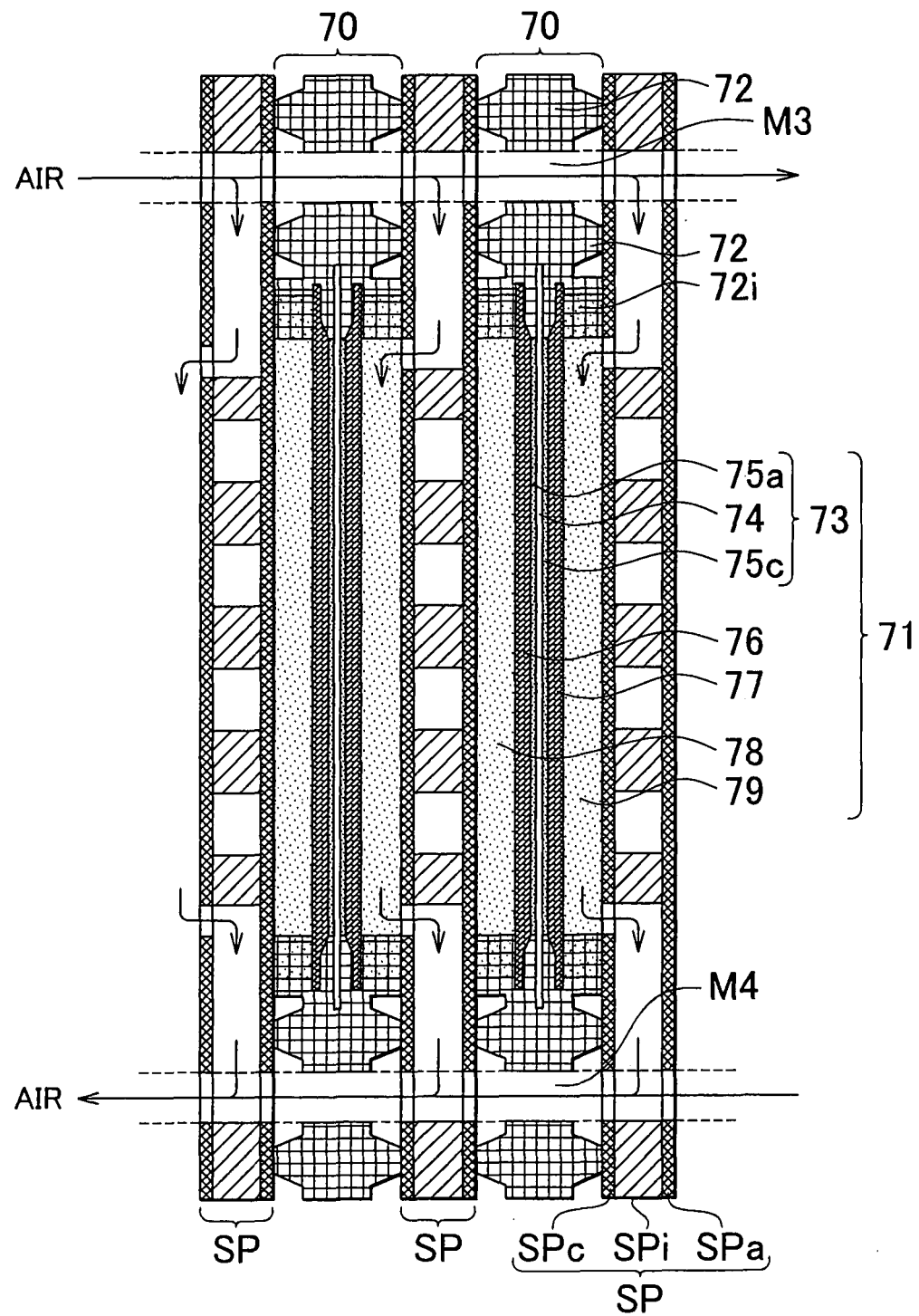
FIG. 1 is a schematic diagram showing a cross-section of a fuel cell as an embodiment of the invention.

Embodiments of the invention will be described. FIG. 1 is a schematic diagram showing a cross-section of a fuel cell as an embodiment of the invention. A fuel cell in this embodiment is a solid polymer type fuel cell, and has a stack structure in which cell assemblies 70 and separators SP are alternately stacked. Each cell assembly 70 is constructed of an electricity-generating laminate 71 and a seal portion 72, and functions as one electric cell.

The electricity-generating laminate 71 includes an MEA 73 (membrane-electrode assembly), gas diffusion layers 76 and 77 formed on both sides of the MEA 73, and gas channel-forming portions 78 and 79 formed on outer sides of the gas diffusion layers 76 and 77. The MEA 73 includes an electrolyte membrane 74, and electrode catalyst layers 75 (i.e., an anode electrode layer 75a and a cathode electrode layer 75c) that are formed on both sides of the electrolyte membrane 74. Each separator SP has a three-layer structure that has an anode-side plate SPa, a cathode-side plate SPc, and an intermediate plate SPi sandwiched between the two plates SPa and SPc. The seal portion 72 of each cell assembly 70 impregnates porous portions of the gas channel-forming portions 78 and 79 during an injection molding process, so that impregnated portions 72i are formed. Incidentally, the overall structure of the fuel cell shown in FIG. 1 is a mere example, and the invention is also applicable to fuel cells whose structures are different from that shown in FIG. 1.

Figure 2:
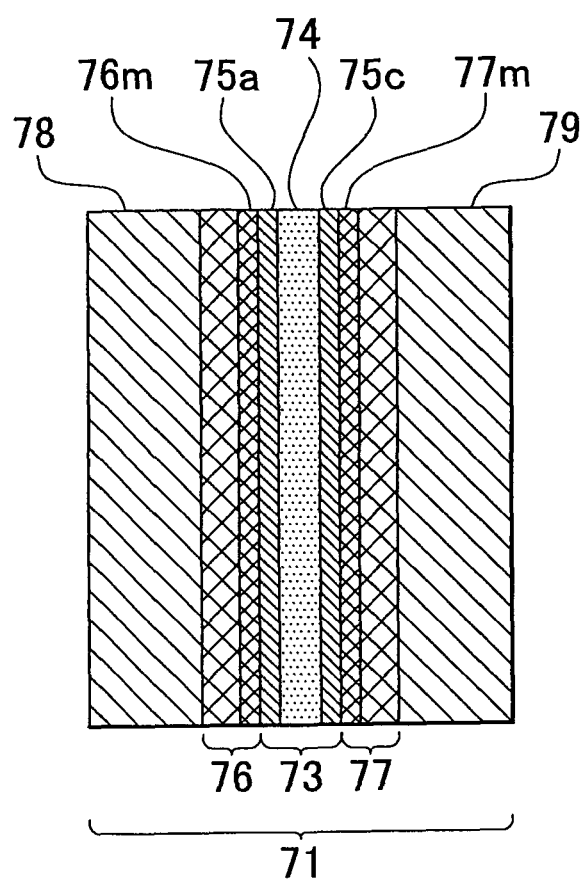
FIG. 2 is an illustrative diagram showing an enlarged view of a construction of an MEA and gas diffusion layers.

FIG. 2 is an illustrative diagram showing an enlarged view of a construction of the MEA and the gas diffusion layers. The electrolyte membrane 74 is a proton-conducting ion exchange membrane that is formed of, for example, a fluorine-based resin material such as Nafion (a registered trademark of Du Pont) or the like. The electrolyte membrane 74 has good electroconductivity in a wet state. The anode electrode layer 75a and the cathode electrode layer 75c are formed on the two outer sides of the electrolyte membrane 74. The two layers each contain carbon particles loaded with a catalyst that accelerates electrochemical reactions (e.g., platinum, or an alloy of platinum and one or more other metals), and an electrolyte (Nafion, or the like) that is substantially the same as or similar to the polymer electrolyte that constitutes the electrolyte membrane 74.

The gas diffusion layers 76 and 77 are formed of an electroconductive porous member. The gas diffusion layer 76 forms a channel of a fuel gas that contains hydrogen. The gas diffusion layer 77 forms a channel of an oxidizing gas that contains oxygen. The gas diffusion layers 76 and 77 can be formed of, for example, various porous materials, including porous carbon materials such as carbon paper, carbon felt, etc. as well as foaming metals, and the like. The gas diffusion layer 76 is stacked on the outer side of the anode electrode layer 75a. Likewise, the gas diffusion layer 77 is stacked on the outer side of the cathode electrode layer 75c. In the gas diffusion layer 76, an MPL (Micro-Porous Layer) layer 76m is formed at an interface with the MEA. Besides, in the gas diffusion layer 77, an MPL layer 77m is formed at an interface with the MEA.

The MPL layers 76m and 77m as water-repellent layers are formed of carbon particles, resin particles made of a water-repellent resin, such as a polytetrafluoroethylene (PTFE) or the like, and cerium-containing oxide particles. The MPL layers 76m and 77m have gas permeability and electroconductivity, and keep the water or moisture in the MEA in a proper range, and accelerate the discharge of extraneous water from the MEA 73. Incidentally, in the MPL layers, carbon fiber may also be used instead of carbon particles.

Besides, the additive amount of the cerium-containing oxide in the MPL layers 76m and 77m in this embodiment is preferably greater than 5 wt % and less than or equal to 30 wt % where 100 wt % is the amount of solid components except the cerium-containing oxide which form the cerium-containing layers. Incidentally, the additive amount of the cerium-containing oxide (hereinafter, also referred to simply as "additive amount of cerium") is found as in the following expression (1):

The additive amount of cerium (wt %)=(the weight of cerium-containing oxide particle material)/((the weight of carbon particle material)+(the weight of PTFE particle material))  (1)

A construction in which cerium-containing layers that contain a cerium-containing oxide are provided on the outer sides of the surfaces of the MEA will make it possible to restrain the decline in the water content of the MEA. This is because the cerium-containing layers containing the cerium-containing oxide that have higher hydrophilicity than the electrolyte membrane are able to retain water produced by the electrochemical reaction of the fuel cell. As a result, it is possible to restrain the increase in the cell resistance (the resistance between the anode electrode layer and the cathode electrode layer) that occurs in connection with decline in the proton conductivity resulting from a decline in the water content of the MEA particularly when the temperature is high, and therefore restrain the decline in the electricity generation performance. Furthermore, if a construction as described above is given, the water-repellent layer (MPL layer) provided as portions of the gas diffusion layers can be caused to function as cerium-containing layers.

Besides, the solid polymer type fuel cell generates hydrogen peroxide ($H_2O_2$) by a side reaction during the electrochemical reaction. Hydrogen peroxide produces highly active radicals by various reactions. The produced radicals cause reactions that serially decompose the electrolyte membrane, and thus damage the electrolyte membrane. However, with the foregoing construction in which the cerium-containing layers that contain cerium-containing oxide are provided on the outer side surfaces of the MEA, it is possible to diffuse cerium ions from the cerium-containing layers into the electrolyte membrane. The cerium ions having diffused in the electrolyte membrane are able to restrain the chemical degradation of the electrolyte membrane that results from radicals. As a result, it becomes possible to improve the durability of the fuel cell.

In this embodiment, a CEZ (cerium-zirconium solid solution) is used as a cerium-containing oxide. The CEZ is a composite of cerium oxide ($CeO_2$) and zirconium oxide ($ZrO_2$). The CEZ used in this embodiment is preferred to have the following characteristics:

The additive amount of cerium oxide in the CEZ is greater than or equal to 85 wt % and less than or equal to 90 wt % where 100 wt % is the amount of solid components contained in the CEZ.

The additive amount of zirconium oxide in the CEZ is greater than or equal to 10 wt % and less than or equal to 15 wt % (more preferably, less than or equal to 12.5 wt %) where 100 wt % is the amount of solid components contained in the CEZ.

The specific surface area of CEZ particles is greater than or equal to 50 $m^2/g$.

The CEZ has a particle size distribution in which D50 is less than or equal to 5 μm and D90 is 15 μm where D50 and D90 represent the particle diameters that correspond to an accumulation of 50% and an accumulation of 90%, respectively, from the fine particle side of the cumulative particle size distribution based on weight of the particles that constitute the CEZ.

Due to the foregoing construction, the dissolution velocity of cerium oxide contained in the cerium-containing oxide can be reduced, so that the cerium oxide can be gradually dissolved in the operation environment of the fuel cell. Therefore, it is possible to maintain the effect of restraining the decline in the water content of the MEA and the effect of restraining the chemical degradation of the electrolyte membrane.

Figure 3A:
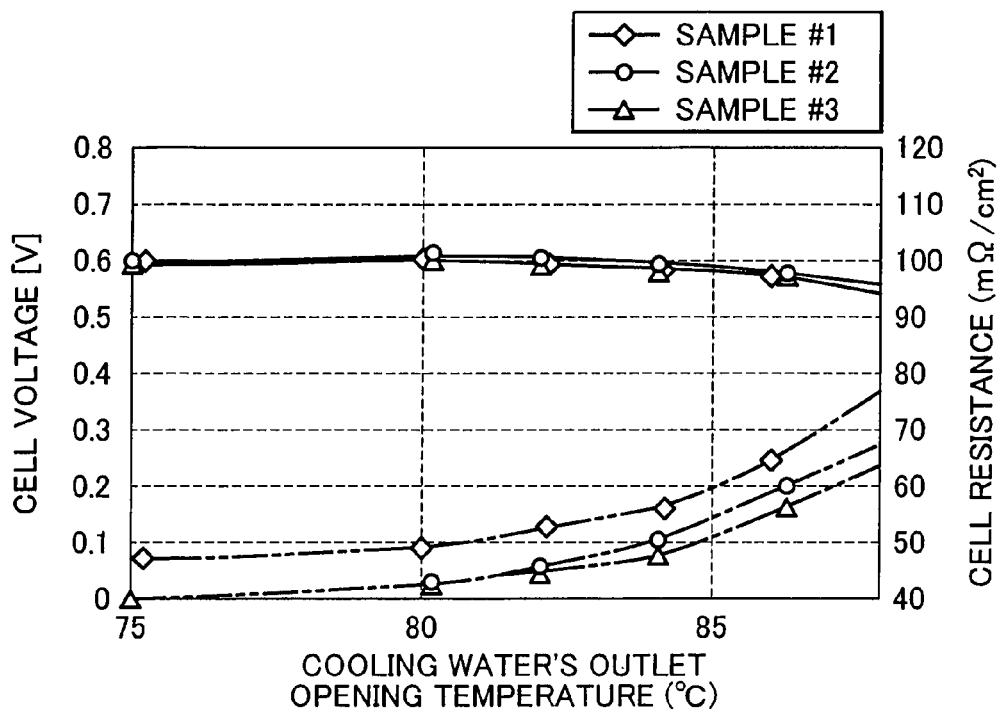
FIGS. 3A and 3B are illustrative diagrams showing results of experiments regarding amounts of a cerium-containing oxide added into a cerium-containing layer and their effects of restraining the increase of the cell resistance.
Figure 3B:
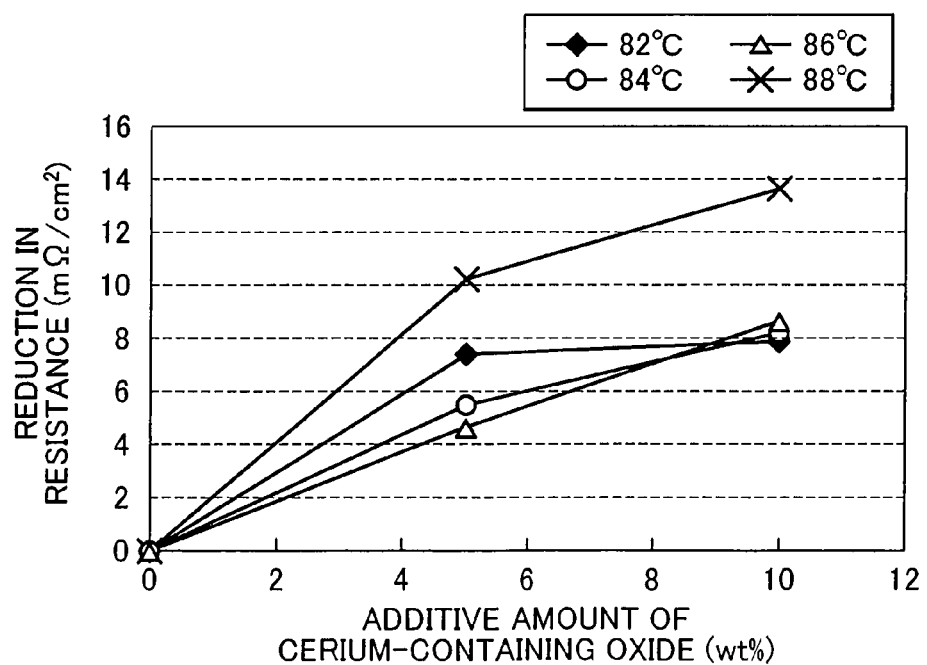

Results of experiments on a fuel cell in accordance with the invention will be described. Firstly, results of an experiment regarding the additive amount of a cerium-containing oxide and the effect of restraining the increase in the cell resistance. FIGS. 3A and 3B are illustrative diagrams showing results of an experiment regarding the additive amount of a cerium-containing oxide in the cerium-containing layers and the effect of restraining the increase in the cell resistance. In this experiment, three samples of fuel cells as described above with reference to FIG. 1 were constructed in which the additive amounts of the cerium-containing oxide in the MPL layers 76m and 77m (FIG. 2) as the cerium-containing layers were varied as follows: 0 wt % (sample #1), 5 wt % (sample #2), and 10 wt % (sample #3). After that, the cell voltage, the cell resistance and the outlet opening temperature of cooling water in the fuel cells of the three samples were measured.

(1) The stoichiometric ratio of the fuel gas supplied to the fuel cells was set at 1.2, and the stoichiometric ratio of the oxidizing gas supplied thereto was set at 1.5, and the fuel cells were caused to generate electricity so that the current density was 2 A/cm². Incidentally, the stoichiometric ratio means the ratio between the required minimum amount of gas for a certain amount of electricity generated by the fuel cell (i.e., the amount of gas used in the electrochemical reaction) and the amount of gas actually supplied. (2) In the state obtained in the foregoing procedure step (1), the cell voltage, that is, the voltage between the anode electrode layer 75a and the cathode electrode layer 75c (see FIG. 1), was measured. (3) In the state obtained in the procedure step (1), the cell resistance, that is, the resistance between the anode electrode layer 75a and the cathode electrode layer 75c (FIG. 1), was measured. (4) In the state obtained in the procedure step (1), the outlet opening temperature of the cooling water was measured.

FIG. 3A is a graph showing an example of results of the experiment obtained as described above. In the graph shown in FIG. 3A, the right-side vertical axis shows the cell resistance [mΩ/cm²], and the left-side vertical axis shows the cell voltage [V]. The horizontal axis shows the outlet opening temperature [° C.] of the cooling water of the fuel cell during the electricity generation. Solid lines in FIG. 3A show the values of the cell voltage measured in the procedure step (2). Besides, interrupted lines the values of the cell resistance measured in the procedure step (3). As can be understood from FIG. 3A, the declines in the cell voltage caused by increases in the cell resistance are conspicuous when the outlet opening temperature of the cooling water is high (i.e., at the time of high temperature) in all the samples.

FIG. 3B is a graph in which the same experiment results as shown in FIG. 3A are shown in a manner different from that in FIG. 3A. In FIG. 3B, the vertical axis shows the amounts of decrease in the cell resistance [mΩ/cm²] with reference to the sample of 0% in the additive amount of the cerium-containing oxide in the MPL layers 76m and 77m (FIG. 2), that is, the sample with no cerium-containing oxide added, as a standard (in which the amount of decrease in the resistance is zero). The horizontal axis shows the additive amount of the cerium-containing oxide in the MPL layers 76m and 77m (FIG. 2). From FIG. 3B, it can be understood that it is possible to enlarge the amount of decrease in the cell resistance (i.e., restrain the increase in the cell resistance) by increasing the additive amount of the cerium-containing oxide in the MPL layers as the cerium-containing layers. Furthermore, the effect of restraining the increase in the cell resistance becomes particularly high in the case of samples #2 and #3, that is, in the case where the additive amount of the cerium-containing oxide is larger than 5 wt %. Thus, by restraining the increase in the cell resistance of a fuel cell, it is possible to improve the output current and the output voltage of the fuel cell during electricity generation.

From the foregoing results of the experiment, it can be said to be preferable that the additive amount of the cerium-containing oxide in the cerium-containing layers be greater than 5 wt %, from the viewpoint of the effect of restraining the increase in the cell resistance.

Figure 4A:
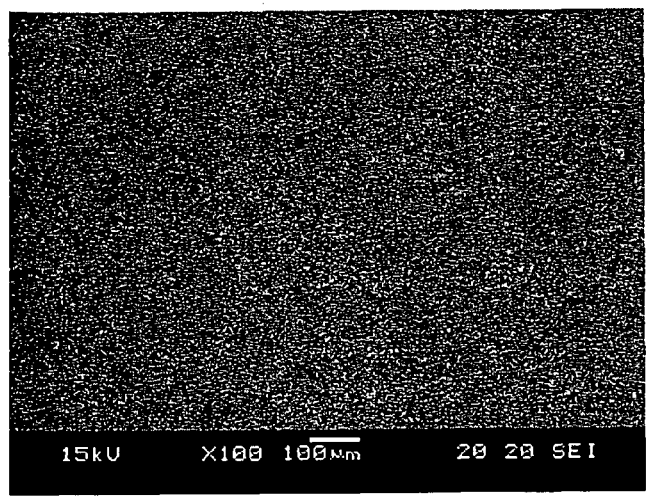
FIGS. 4A to 4C are illustrative diagrams showing results of experiments regarding amounts of a cerium-containing oxide added into the cerium-containing layer and their effect of restraining the increase of the cell resistance.
Figure 4B:
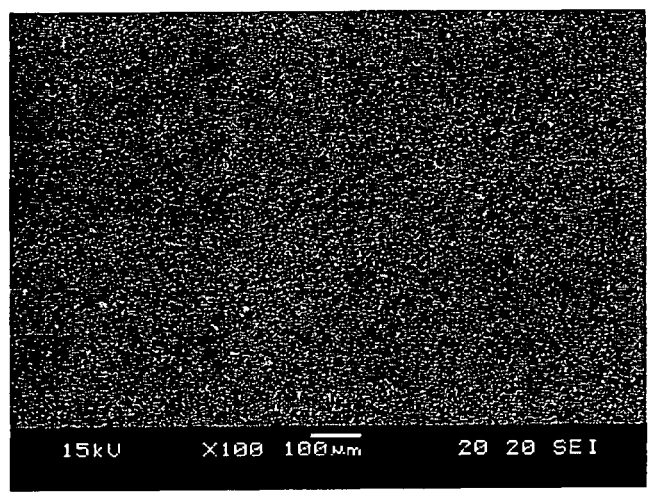
Figure 4C:
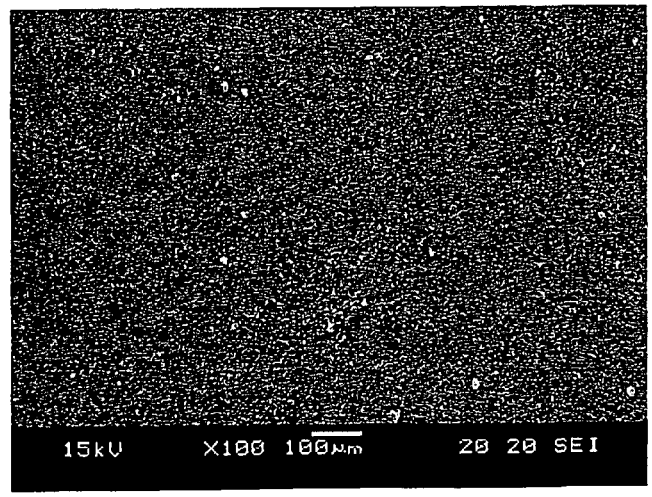

Next, results of experiments regarding the additive amount of the cerium-containing oxide and the decline in dispersibility will be described. FIGS. 4A to 4C are illustrative diagrams showing results of an experiment regarding the additive amount of the cerium-containing oxide in the cerium containing layers and the decline in dispersibility. In this experiment, firstly, three samples of gas diffusion layers and MPL layers as described above with reference to FIG. 2 were fabricated in which the additive amount of the cerium-containing oxide in the MPL layers 76m and 77m (FIG. 2) as the cerium-containing layers were varied as follows: 5 wt % (sample #11), 10 wt % (sample #12), and 30 wt % (sample #13). After that, surfaces of the MPL layers formed in the gas diffusion layers were microscopically photographed. FIG. 4A shows a photograph of a surface of sample #11, and FIG. 4B shows a photograph of a surface of sample #12, and FIG. 4C shows a photograph of a surface of sample #13.

As shown in FIG. 4C, in sample #13 (30 wt % in the additive amount of the cerium-containing oxide), CEZ (cerium-zirconium solid solution) is exposed in the surface, and asperities are present therein, in comparison with samples #11 and #12 shown in FIGS. 4A and 4B. That is, the photograph in FIG. 4C shows that the dispersibility of cerium-containing oxide particles in the MPL layers declined. This is considered to be because when the MPL layers were fabricated, that is, when a mixed paste of carbon particles, PTFE particles and cerium-containing oxide particles was applied to the gas diffusion layer, the cerium-containing oxide particles in the paste agglomerated.

Figure 5:
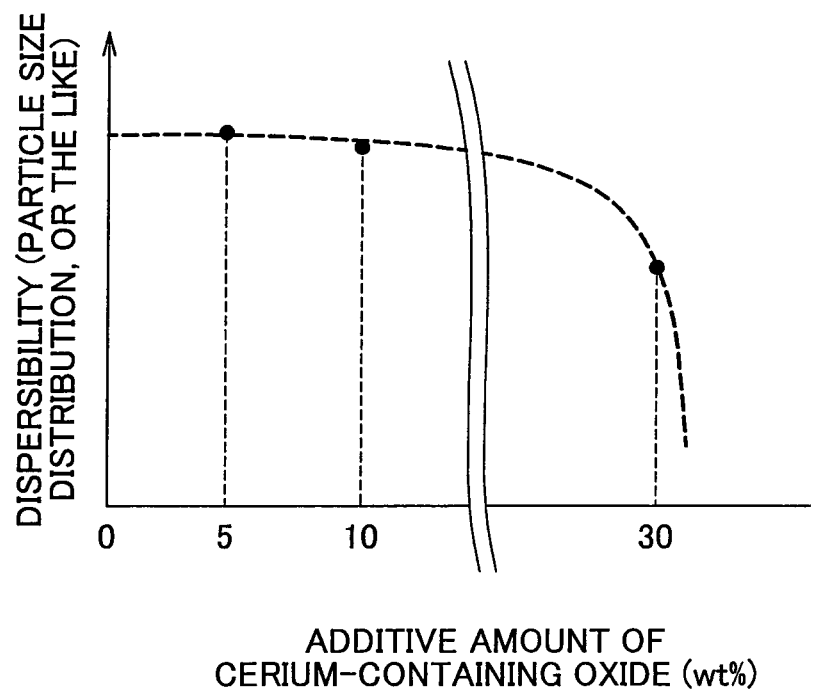
FIG. 5 is a graph showing results of experiments regarding amounts of a cerium-containing oxide added into the cerium-containing layer and the decrease in the dispersibility.

FIG. 5 is a graph showing results of an experiment regarding the additive amount of the cerium-containing oxide in the cerium-containing layers and the decline in dispersibility. In FIG. 5, the vertical axis shows the particle size distribution (dispersibility). The particle size distribution can be measured by, for example, using a laser diffraction/scatter type particle size distribution measurement device. The horizontal axis in FIG. 5 shows the additive amount of the cerium-containing oxide in the cerium-containing layers. As can be seen in FIG. 5, this particle size distribution also shows that the particle size distribution (dispersibility) declined in sample #13 (30 wt % in the additive amount of the cerium-containing oxide), in comparison with samples #11 and #12. In the case where the dispersibility declines as described above, cerium-containing oxide particles degrade and damage the electrolyte membrane, so that the durability of electrolyte membrane declines. Therefore, it is preferable to restrain the decline in the dispersibility of the cerium-containing oxide particles.

From the foregoing experiment results, it can be said to be preferable that the additive amount of the cerium-containing oxide in the cerium-containing layers be less than or equal to 30 wt %, from the viewpoint of restraining the decline in the dispersibility of the cerium-containing particles in the MPL layers.

Incidentally, the invention is not limited to the examples and embodiments described above. On the contrary, it is possible to carry out the fuel cell of the invention in various forms without departing from the gist of the invention; for example, the following modifications are also possible.

A first modification will be described. In the foregoing embodiments, the MPL layers 76m and 77m as the cerium-containing layers, the gas diffusion layers 76 and 77, the gas channel-forming portions 78 and 79 are formed in that order at both sides of the MEA 73. However, these portions can be omitted. For example, if the MPL layers 76m and 77m, the gas diffusion layers 76 and 77 and the gas channel-forming layers 78 and 79 are omitted, cerium-containing layers may be provided at the outer sides of the surfaces of the MEA, that is, at the interfaces with the separators SP. Besides, for example, if the MPL layers 76m and 77m are omitted, cerium-containing layers may be provided in portions of the gas diffusion layers 76 and 77 which are near the interfaces thereof with the outer sides of the surfaces of the MEA.

A second modification will be described. In the foregoing embodiments, both the cerium-containing layer formed on the outer side of the anode electrode layer 75a and the cerium-containing layer formed on the outer side of the cathode electrode layer 75c contain a cerium-containing oxide. However, such a cerium-containing layer may also be formed on only one of the anode electrode layer side or the cathode electrode layer side. Besides, a cerium-containing oxide catalyst may be contained in only one of the anode electrode layer side and the cathode electrode layer side. However, in order to achieve higher effect of restraining the decline in the water content, it is preferable that cerium-containing layers that contain a cerium-containing oxide be formed on both the anode electrode layer side and the cathode electrode layer side.

A third modification will be described. Although the foregoing fuel cell systems of the embodiments employ solid polymer fuel cells as fuel cells, the invention is not limited to such a construction. On the contrary, it is also possible to use various other types of fuel cells such as solid oxide electrolyte type fuel cells, molten carbonate electrolyte type fuel cells, etc.

Incidentally, the invention can be realized in various forms. For example, the invention can be realized in a fuel cell gas diffusion layer or a manufacturing method for a fuel cell gas diffusion layer, a fuel cell separator or a manufacturing method for a fuel cell separator, a fuel cell that has fuel cell gas diffusion layers or fuel cell separators as mentioned above, a mobile unit, such as a vehicle or the like, which is equipped with such a fuel cell, etc. Besides, the invention does not need to include all the foregoing characteristics, but can also be constructed without including one or more of the characteristics.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell comprising:
    a membrane-electrode assembly in which electrode catalyst layers are formed on two surfaces of an electrolyte membrane; and
    a gas diffusion layer that is provided at an outer side of at least one of the electrode catalyst layers, is made of an electroconductive porous member, and includes a cerium-containing layer, wherein
    the cerium-containing layer is formed on at least one of the electrode catalyst layers and contains cerium-containing oxide particles, carbon particles and water-repellent material particles,
    an amount of the cerium-containing oxide particles is greater than 5 wt % and less than or equal to 30 wt % where 100 wt % is an amount of solid components except the cerium-containing oxide particles which form the cerium-containing layer,
    the cerium-containing oxide particles have a higher hydrophilicity than the electrolyte membrane, and
    the cerium-containing oxide particles have a specific surface area of 50 $m^2$/g or more.

2. The fuel cell according to claim 1, wherein the cerium-containing oxide particles include cerium oxide ($CeO_2$) and zirconium oxide ($ZrO_2$).

3. A fuel cell comprising:
    a membrane-electrode assembly in which electrode catalyst layers are formed on two surfaces of an electrolyte membrane;
    a cerium-containing layer that is formed on at least one of a two surfaces of the membrane-electrode assembly, and that contains a cerium-containing oxide in an amount that is greater than 5 wt % and less than or equal to 30 wt % where 100 wt % is an amount of solid components except the cerium-containing oxide which form the cerium-containing layer; and
    a gas diffusion layer that is provided at an outer side of at least one of the electrode catalyst layers and that is formed by an electroconductive porous member, wherein
    the cerium-containing layer is a water-repellent layer that is a portion of the gas diffusion layer and that contains carbon and a water-repellent material that are provided at an interface between the gas diffusion layer and the membrane-electrode assembly, and
    an amount of cerium oxide contained in the cerium-containing oxide is greater than or equal to 85 wt % and less than or equal to 90 wt % where 100 wt % is an amount of solid components of the cerium-containing oxide.

4. A fuel cell comprising:
    a membrane-electrode assembly in which electrode catalyst layers are formed on two surfaces of an electrolyte membrane;
    a cerium-containing layer that is formed on at least one of a two surfaces of the membrane-electrode assembly, and that contains a cerium-containing oxide in an amount that is greater than 5 wt % and less than or equal to 30 wt % where 100 wt % is an amount of solid components except the cerium-containing oxide which form the cerium-containing layer; and
    a gas diffusion layer that is provided at an outer side of at least one of the electrode catalyst layers and that is formed by an electroconductive porous member, wherein
    the cerium-containing layer is a water-repellent layer that is a portion of the gas diffusion layer and that contains carbon and a water-repellent material that are provided at an interface between the gas diffusion layer and the membrane-electrode assembly, and
    an additive amount of zirconium oxide is greater than or equal to 10 wt % and less than or equal to 15 wt % where 100 wt % is an amount of solid components of the cerium-containing oxide.

5. The fuel cell according to claim 4, wherein the additive amount of zirconium oxide is 12.5 wt %.

\* \* \* \* \*